June 24, 1969  J. H. McAULEY  3,451,529
FLEXIBLE MATERIAL-CONVEYING CHAIN
Filed Oct. 6, 1967  Sheet 3 of 3

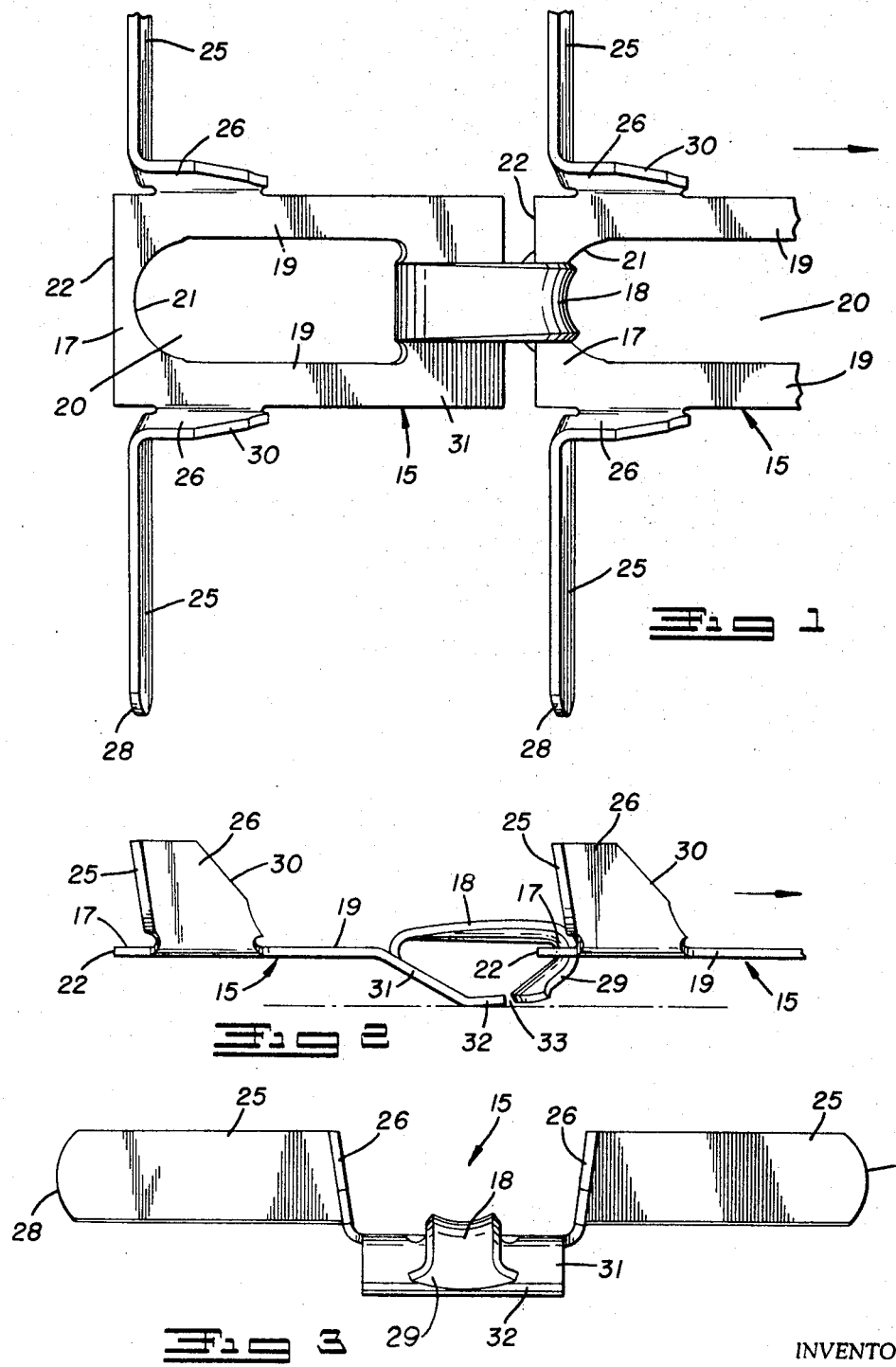

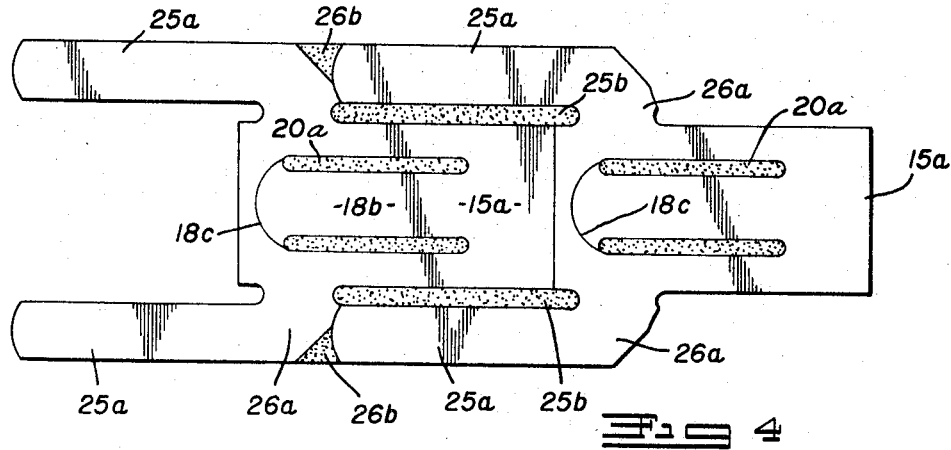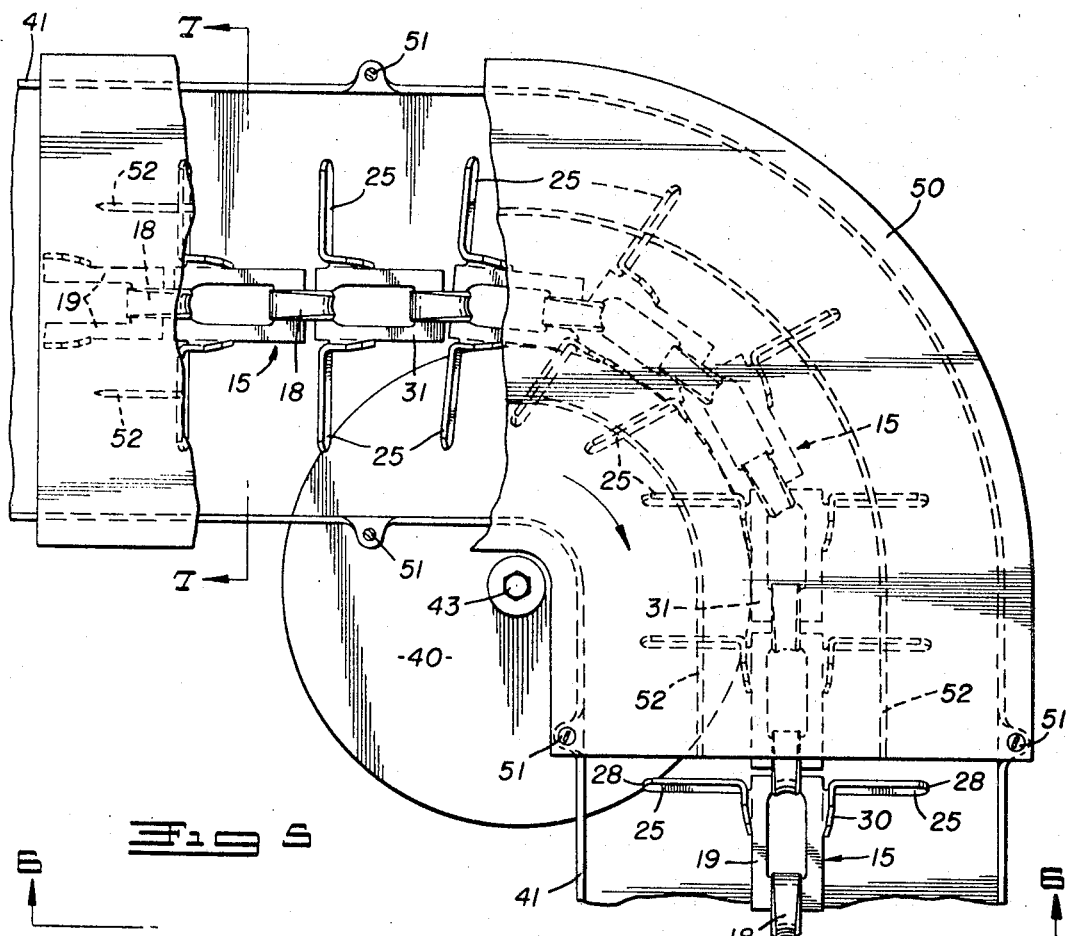

INVENTOR.
JAMES H. McAULEY
BY
MAHONEY, MILLER & RAMBO
BY Wm. V. Miller
ATTORNEYS United States Patent Office 3,451,529
Patented June 24, 1969

3,451,529
FLEXIBLE MATERIAL-CONVEYING CHAIN
James H. McAuley, Bremen, Ohio, assignor to McAuley Manufacturing, Inc., Bremen, Ohio, a corporation of Ohio
Filed Oct. 6, 1967, Ser. No. 673,368
Int. Cl. B65g 19/00
U.S. Cl. 198—173                    8 Claims

ABSTRACT OF THE DISCLOSURE

A chain of the general nature disclosed in the patent to Graetz et al. No. 2,672,059, issued Mar. 16, 1954, composed of interlocking links but having greatly increased material-moving capacity. It is produced in very wide form to increase its material-moving capacity without the waste of material and without sacrifice of strength. Because of its great width and resulting increased material-moving capacity, it is especially suited for conveying loose bulky animal feed such as silage, haylage, etc. Because of its design, it can be made wide with a minimum of material by a series of identical stampings from a continuous strip of steel or other suitable material.

BRIEF DESCRIPTION OF DRAWINGS

In the accompanying drawings, I have illustrated a preferred form of my invention and in these drawings:

FIGURE 1 is a plan view of interlocked links of a length of chain embodying my invention.

FIGURE 2 is an edge elevational view of the length of chain shown in FIGURE 1.

FIGURE 3 is an elevational view of the leading edge of one of the links of chain.

FIGURE 4 is a schematic plan view showing how the chain link blanks are stamped from a continuous strip of material.

FIGURE 5 is a plan view showing how the chain of my invention may be in a feed-trough passing horizontally around a corner.

DETAILED DESCRIPTION OF DRAWINGS

Figure 6:
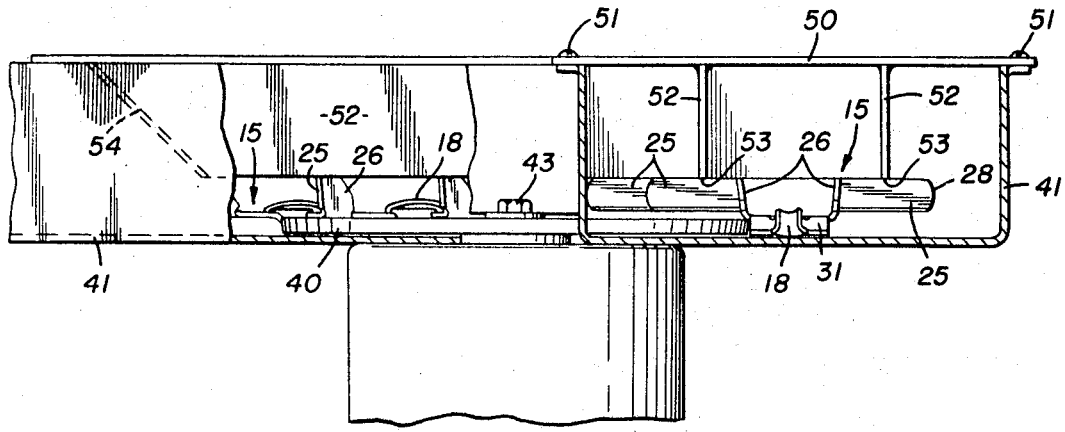
FIGURE 6 is an edge elevational view of the structure of FIGURE 5.

With reference to the drawings, I have illustrated in FIGURES 1–3 a flexible chain composed of the interlocking links 15 which are so connected together that the links may pivot relative to each other in both vertical and lateral planes, may twist relative to each other about the longitudinal axis of the chain, or may move bodily relative to each other in both planes, to facilitate various changes in directions of travel and prevent jamming of material in the interlocking joints or beneath the chain when it is used in a feed trough or the like.

Each of the links 15 takes the form illustrated and preferably is produced by a die cutting and stamping operation. Each link consists of a substantially flat body which has a flat pintle-portion 17 at one end and a hook-shaped, pintle-receiving barrel portion 18 at the other end which are joined together by the two integral flat connecting side portions 19. The above arrangement of parts of the link provides a central longitudinally extending elongated aperture 20.

The pintle portion 17 is at the rear or training end of the link relative to its intended direction of travel, as indicated in FIGURES 1 and 2, and is provided with an inner or forward curved edge 21, and an outer or rear straight edge 22 which extends laterally across the rear end of the body. Upstanding flights 25 extend laterally outwardly for substantial distances from the straight connecting portions 19 at points spaced slightly behind the pintle portion 17 and act as material-moving dozer blades. The flights or dozer blades 25 are formed integral with the body and are upstanding or outwardly projecting almost at a right angle to the place of the body of the link. The blades 25 extend laterally in opposite directions from the body of the link at right angles to its longitudinal center line and axis of travel. The blades 25 are joined to the flat body of the link by connecting wings 26 which turn upwardly and then laterally outwardly and are so shaped that the blades 25 lean rearwardly slightly, as shown in FIGURE 2. The outer ends of the blades 25 are curved to eliminate sharp corners, as indicated at 28. The leading edge of each connecting wing 26 is beveled at 30 (FIGURE 2) to eliminate a sharp upper leading corner.

The pintle-receiving hook-shaped barrel portion 18 is formed on the forward or leading transverse portion 31 of the body of the link opposite the end on which the pintle 17 is formed and is located laterally midway between the opposite flat side portions 19. It will be noted in FIGURE 2 that portion 31 angles downwardly. The hook portion of the barrel 18 extends forwardly in the plane of the body of the link, that is, in the plane of the flat side portions 19, and has an extremity 29 that turns downwardly and then rearwardly toward the forward flat portion 32 of the transverse portion 31 but terminates short thereof to provide a space 33 therebetween. It will be noted that portion 32 is in a plane below and parallel to the body of the link which includes the flat portions 19. The hook extremity 29 is curved bodily transversely to provide a leading concave surface and a rear convex surface. The space 33 is of less longitudinal extent that the front to rear extent of the pintle portion 31 and is also less than the thickness of the pintle portion. Thus, accidental unlocking is prevented under normal conditions of use of the chain and separation is permitted if the pintle portion is turned on edge and forced through the space 33.

The chain links may be produced from a continuous strip of steel or other suitable material by a continuously progressing die-cutting and stamping operation in which flat blanks of the type indicated in FIGURE 4 are produced. There will be little wastage of material, this small amount of waste being indicated by the shaded areas in this figure. The cuts are made along the full lines indicated in this figure and it will be noted that the flat body-forming portion 15a of the blank is produced at one end and the flight or blade-forming parallel tongues 25a are produced in longitudinal relationship and outwardly of the body portion 15a to which they are connected by the wing-forming connecting portions 26a. All of these portions are formed in a common flat plane. It will be noted that the material between the portions 25a of one flat blank provides the material for the body portion 15a of the adjacent blank and the adjacent edges are separated at the slugs 25b which are removed. The opening 20 of one link is produced by removing the slugs 20a leaving a strip of metal 18b which is later cut at the transverse line 18c and is then curled up to form the hook-shaped barrel 18. The corner slugs 26b are also removed from the wing-forming portions 26a.

Figure 7:
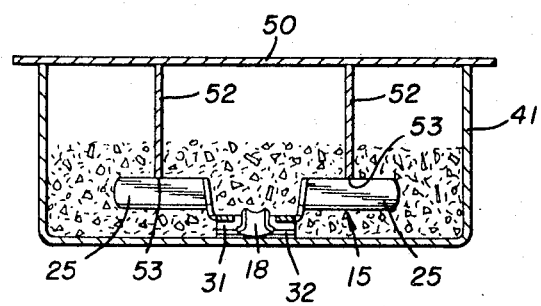
FIGURE 7 is a vertical transverse sectional view taken along line 7—7 of FIGURE 5.

In FIGURES 5–7, I have illustrated how a chain embodying my invention can pass horizontally or "corner" around an idler wheel indicated at 40 which turns on a vertical axis. The chain may pass through a horizontal trough 41 which may be of a cross-sectional shape like that shown in FIGURE 7. In passing through this trough, the flat portions 32 of the leading cross members 31 of the succeeding links will bear on the bottom of the trough and will serve as bearing feet preventing the hook-extremities 29 of the barrels 18 from sliding on the bottom of the trough which would result in quick wear thereof. This arrangement will support the various links with their flat bodies in a plane slightly elevated relative to the bottom of the trough, so as to reduce friction as compared to that which would result if they were in flat sliding contact with the trough bottom. The drive of the chain will be a straight-through or straight-line drive by a vertically disposed sprocket which will be in a vertical plane common to the longitudinal axis of the chain and will be disposed tangentially relative to the chain and will press the chain down into the horizontal trough. This type of drive is shown in my copending application filed simultaneously with this application. However, it is to be understood that the chain can be supported for horizontal or vertical travel or any angle therebetween. If traveling vertically, it will be disposed in a closed pipe or tube (not shown) closely conforming to the cross-sectional shape of the chain, the flights or blades 25 serving to lift the feed material vertically.

In the cornering movement of the chain, it will be noted that it will pass around the wheel 40 which is a thin flat disc with a smooth peripheral edge and is mounted on a vertical shaft 43 and the wheel will have its lower flat surface just above the bottom of the trough, as indicated in FIGURE 6. The flights 25 will be spaced above the bottom of the trough to an extent greater than the thickness of the disc wheel 40. The peripheral edge of the wheel will engage the downwardly angled portions 31 of the successive links and will guide the links as they corner to change the direction of travel of the chain. As shown in FIGURES 5 and 6, the successive links will overlap as they swing relatively in changing direction with the inner flights 25 of a preceding link swinging over the leading portion 31 of a succeeding link. Also, the inner flights 25 adjacent the wheel will merely swing over the upper flat surface of the wheel without contacting therewith, as indicated in FIGURES 5 and 6.

To keep the chain in contact with the bottom of the trough 41 during its cornering operation, the hold-down guide arrangement shown in FIGURES 5 and 6 is preferably used. This arrangement is carried on a cap or lid 50 which is bolted in place at the curved portion of the trough where it changes directions. This cap 50 is bolted by bolts 51 in position on the trough and has a pair of chain hold-down guide strips 52 formed thereon and depending therefrom, these guides being curved horizontally in accordance with the curve of the trough. The guides are parallel and their lower edge extremities 53 are adapted to engage the links of the chain at their upper sides. The edges 53 are thus so positioned that they engage the upper edges of the outstanding flights 25, it being understood that they are spaced laterally apart a distance greater than the width of the body portions of the links so they will engage the flights. The ends of the guides 52 which first engage the chain are undercut or beveled downwardly in the direction of travel of the chain, as indicated at 54, so as to gradually press the chain down against the bottom of the trough.

Thus, the chain will be of wide form so it can engage and move great amounts of material. It can be made wide without sacrifice of strength and without wasting material. Due to the form of the links, they may be produced continuously from interfitting link blanks from a continuous strip without discarding and wasting large amounts of the material. The blades 25 will engage large quantities of material and move it along in the trough. The rearward canting of these blades will prevent the material from being jammed downwardly and, therefore, the chain will tend to more readily move the material along with less driving force due to the fact that jamming of the material is prevented. The supporting of the chain by the bearing feet 32 will result in less friction and wear and it will be noted these feet are of substantial width compared to the barrel 18. Also, the chain will readily corner and the inner flights 25 will swing over the idler wheel 40 and adjacent links without jamming therewith. The hold-down guides 52, one for each flight 25, will hold the chain down during cornering and will break up or separate the material as it is moved into association with the inlet ends 54 thereof.

Various other advantages will be apparent.

Having thus described this invention, what is claimed is:

1. A chain composed of interlocking links, each of said links comprising a substantially flat body portion with side edges, a transversely extending flat pintle-portion at one end and a hook-shaped pintle-receiving barrel portion at its opposite end projecting longitudinally outwardly and then turned longitudinally inwardly: material pusher blade portions extending laterally from the side edges of said body portion in opposite directions and being substantially upright relative to the plane of said flat body portion, said flat body portion having flat connecting side portions extending between said flat pintle-portion at one end thereof and a transverse portion at the other end thereof which carries said pintle-receiving barrel portion, said pusher blade portions being formed integral with said connecting side portions, and wing connecting portions between said side portions and said pusher blade portions, said wing connecting portions being turned upwardly and then outwardly.

2. A chain according to claim 1 in which said pusher blade portions are substantially upright but are canted rearwardly and upwardly toward the pintle-portion end of said body portion.

3. A chain according to claim 2 in which the upstanding wings are beveled and the outer ends of the blades are rounded.

4. A chain according to claim 1 in which said transverse portion which carries said pintle-receiving barrel portion is provided with a bearing foot disposed at a lower level than the barrel portion to support the chain link and prevent wear on the barrel portion.

5. A chain according to claim 4 in which the transverse portion extends downwardly at an angle and has the bearing foot formed thereon in a plane parallel to that of the flat body portion.

6. In combination with the chain of claim 5, a guide wheel around which the chain laterally bends, said wheel contacting with the sides of the links of the chain and engaging the downwardly angled transverse portion at the end thereof, said wheel being of a thickness to permit said pusher blade portions to swing over the upper surface thereof as the chain travels around the wheel.

7. The combination of claim 6 including hold-down means adjacent the periphery of the wheel for engaging the upper sides of the links as they pass around said wheel.

8. The combination of claim 7 in which said hold-down means comprise guide strips laterally spaced along the path of travel of the chain about the wheel and engaging the outwardly protecting pusher blade thereon.

References Cited

UNITED STATES PATENTS 3,189,164   6/1965   Robinson _____ 198—168
3,262,547   7/1966   McAuley _____ 198—173

EDWARD A. SROKA, *Primary Examiner.*